United States Patent [19]
Davidson

[11] Patent Number: 6,097,363
[45] Date of Patent: Aug. 1, 2000

[54] HIGH RESOLUTION COLOR COMPUTER DISPLAY TO BE WORN ON THE HEAD OF AN OPERATOR

[75] Inventor: Howard Davidson, San Carlos, Calif.

[73] Assignee: Sun Microsystems, Inc.

[21] Appl. No.: 07/983,118

[22] Filed: Nov. 30, 1992

Related U.S. Application Data

[63] Continuation of application No. 07/718,010, Jun. 20, 1991, abandoned.

[51] Int. Cl.[7] ..................................................... G09G 3/36
[52] U.S. Cl. ............................ 345/88; 345/152; 349/108
[58] Field of Search ..................................... 340/705, 795, 340/783; 358/94, 241, 75; 359/201, 17, 22, 24, 27, 28, 32; 356/350; 345/88, 152; 348/742, 743, 795; 349/108, 109

[56] References Cited

U.S. PATENT DOCUMENTS

| | | | |
|---|---|---|---|
| 4,120,587 | 10/1978 | Vali et al. | 356/350 |
| 4,378,568 | 3/1983 | Mir | 358/75 |
| 4,380,023 | 4/1983 | Mir | 358/75 |
| 4,557,563 | 12/1985 | Sprague | 340/783 |
| 4,593,978 | 6/1986 | Mourey et al. | 345/88 |
| 4,637,679 | 1/1987 | Funato | 359/18 |
| 4,680,579 | 7/1987 | Ott | 340/752 |
| 4,720,706 | 1/1988 | Stine | 340/752 |
| 4,807,978 | 2/1989 | Grinberg et al. | 345/88 |
| 4,812,000 | 3/1989 | Rouille et al. | 359/201 |
| 4,907,862 | 3/1990 | Suntola | 345/88 |
| 4,978,202 | 12/1990 | Yang | 345/88 |
| 5,040,058 | 8/1991 | Beamon, III | 340/705 |
| 5,162,929 | 11/1992 | Roddy et al. | 359/17 |

FOREIGN PATENT DOCUMENTS

| | | | |
|---|---|---|---|
| 2172733 | 9/1986 | United Kingdom | 340/703 |

*Primary Examiner*—Amare Mengistu
*Attorney, Agent, or Firm*—Blakely Sokoloff Taylor & Zafman

[57] ABSTRACT

An arrangement for displaying the output of an electronic system such as a computer including a light gate array having a column of light windows; apparatus for providing red light to the windows of a column for a predetermined period; apparatus for providing green light to the windows of a column for a predetermined period; apparatus for providing blue light to the windows of a column for a predetermined period; apparatus for opening each of said windows for preselected periods during the periods in which light from the red, green, and blues sources are available; and apparatus for scanning the light transferred by the windows for viewing to focus at points defining columns of pixels.

12 Claims, 6 Drawing Sheets

HIGH RESOLUTION COLOR COMPUTER DISPLAY TO BE WORN ON THE HEAD OF AN OPERATOR

This is a continuation of application Ser. No. 07/718,010 filed on Jun. 20, 1991 now abandoned.

FIELD OF THE INVENTION

This invention relates to computer displays and, more particularly, to an improved high resolution color display to be worn by the operator.

HISTORY OF THE PRIOR ART

There have been a number of computer displays devised to be worn on the head of the operator. One advantage of such a display is that it takes very little room. Another advantage is that it may usually be viewed with one eye so that the view in the display may be superimposed on the background provided by the operator's surroundings. Such a display may also allow a great deal of movement by the operator. Moreover, the view provided by such a display is typically private to the operator. For these and other reasons, so called "heads up" displays have been designed.

Typically, head mounted displays offer limited capabilities. For example, one such display manufactured and sold by Reflection Technology, Waltham, Mass., offers what would be called a monochrome picture, a single red color of characters displayed against a black background. Red is the color used because the display is created by projecting an image created by light emitting diodes onto a mirror which scans the image in front of the eye. Although red light emitting diodes are inexpensive and provide a good image, it has not been possible to construct a color display using red, green, and blue diodes because suitable blue light emitting diodes are not available.

Not only are inexpensive color head mounted displays unavailable, their resolution is quite low. For example, the above-mentioned monochrome display provides a picture which is 280 lines by 720 columns. The resolution is limited because the light emitting diodes used in the display offer a relatively crude method of defining the individual pixels to be displayed.

In order to be acceptable for use with the typical desktop computer such as a work station, a head mounted display should offer the same advantages as a typical work station display. The typical display used with a work station offers a color or a gray scale picture at a resolution of approximately one thousand by one thousand pixels.

Recently a new heads up display capable of displaying color at high resolutions has been devised. This new display is described in U.S. patent application Ser. No. 07/663,742, entitled HIGH RESOLUTION COLOR COMPUTER DISPLAY TO BE WORN ON THE HEAD OF AN OPERATOR, H. Davidson, filed Mar. 1, 1991, and assigned to the assignee of the present invention. This new display provides white light to a light gate assembly. The light gate assembly filters the white light and provides light of the three primary colors red, green, and blue for generating each pixel displayed. In an alternative embodiment, white light of different intensities may be transferred by the light gate assembly without filtering to produce a gray scale display.

The light gate assembly provides a column of individual light gate windows equal to the number of rows of pixels to be displayed. All of the individual pixels of each column are provided simultaneously and beamed to a scan mirror. The scan mirror directs all of the pixels of a column through a lens system to focus on the eye. At each individual step of the traverse of the scan mirror, all of the pixels in a column are displayed. After an interval equivalent to the scan time between two adjacent pixels being displayed, the light gate assembly provides the next pixel in each row as the next column of pixels. The scan mirror moves an incremental amount with each column of pixels until a projected distance has been traversed equivalent to the length of a row. Thus, as the mirror moves, the pixels of each row of the column are sequentially provided by the individual light gate windows at each position of the column from a frame buffer associated with the output of a computer. In a preferred embodiment of the invention, a row may consist of 1280 pixels and a column may be 1024 pixels high so that a resolution of 1280 by 1024 is realized.

At each pixel position in the column, the appropriate light values of red, green, and blue are generated and combined by projection to the same point to create the desired color at the pixel position. The individual colors are actually projected in sequence as the scan mirror moves incrementally within a single column, but the three shades are arranged to project to the same point.

In order to allow all three colors of which a pixel consists to be projected within the period of eye retention so that a single combined color occurs at a pixel position, the light gate assembly for producing a single column of pixels is comprised of six columns of what amount to individual windows through which light may be shown. Two adjacent ones of these columns furnish green light through each window, two furnish blue light, and two furnish red light. Using two columns for each of the three colors allows complete color coverage even though conductors adjoin the individual windows. The six columns are separated so that each is actually scanned independently as the scan mirror moves to produce a single column of pixels. By selecting the interval at which each window is displayed to match the rate of scan of the mirror and by offsetting all six columns of windows by the same amount, the windows of all three colors may be made to focus at the same point on the eye to produce the appropriate column of color pixels within the period of retention of the eye. An alternative arrangement of a light gate utilizes a single column of windows to provide a gray scale display.

Although the invention described functions well, the color light gate assembly with its six columns of windows is quite complicated and requires a very large number of connections. A reduction in this complication would be very desirable.

SUMMARY OF THE INVENTION

It is, therefore, an object of the present invention to provide an improved high resolution head mounted color display.

These and other objects of the present invention are realized in an arrangement for displaying the output of an electronic system such as a computer comprising a light gate array having a column of light windows; means for providing red light to the windows of a column for a predetermined period; means for providing green light to the windows of a column for a predetermined period; means for providing blue light to the windows of a column for a predetermined period; means for opening each of said windows for preselected periods during the periods in which light from the red, green, and blues sources are available; and means for scanning the light transferred by the windows for viewing to focus at points defining columns of pixels.

DETAILED DESCRIPTION OF THE INVENTION

Figure 1:
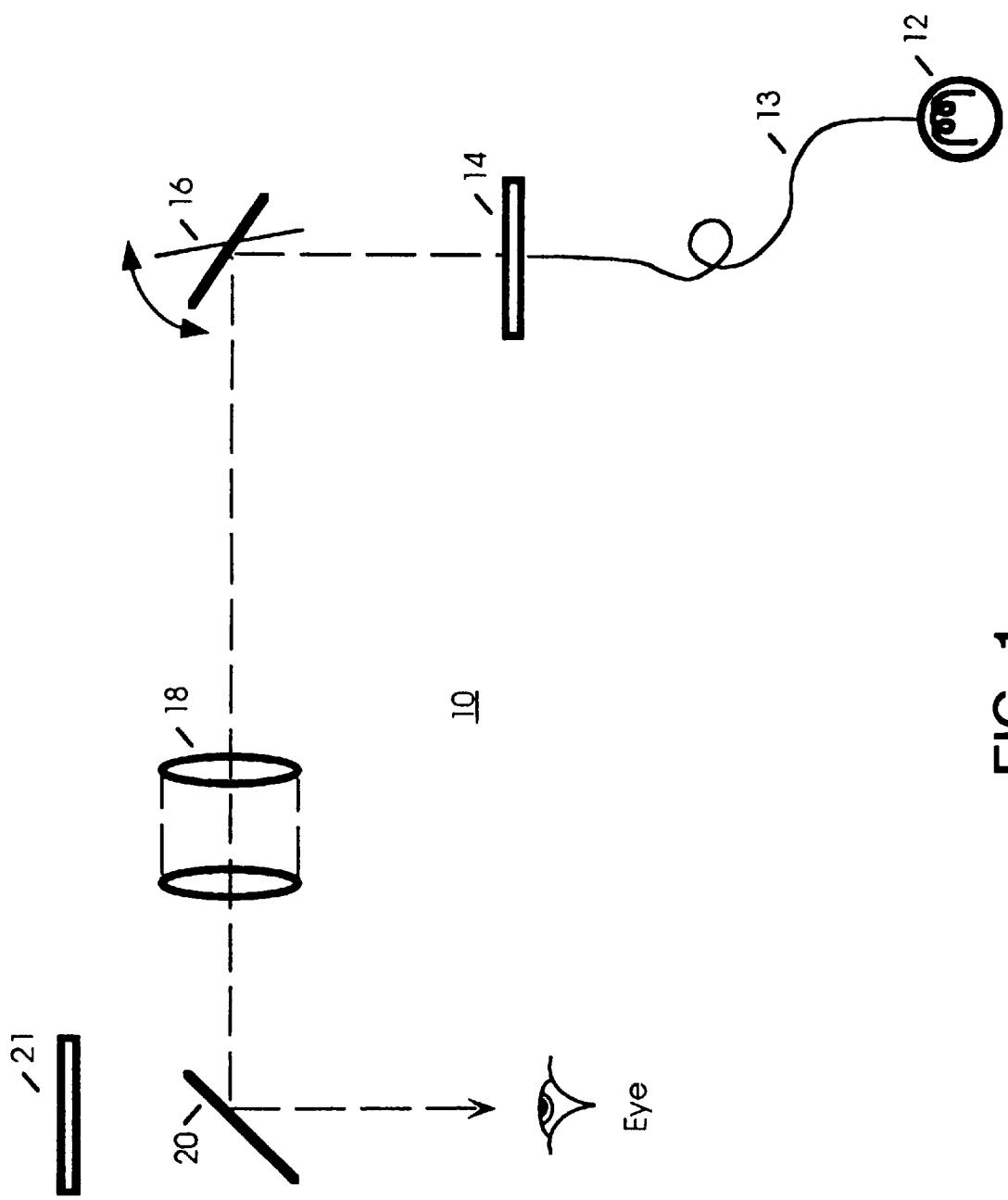
FIG. 1 is a general pictorial view of a head mounted display constructed in accordance with the present invention.

Referring now to FIG. 1 there is shown a pictorial view of a head mounted display 10 constructed in accordance with the above-described invention of the co-pending patent application. The display 10 includes a source of light such as an incandescent lamp 12 which provides white light through a fiber optics cable 13 to a light gate assembly 14. The light gate assembly 14 filters the white light and provides light of the three primary colors red, green, and blue for generating all of the colors necessary for each pixel to be presented on a color output display.

In particular, the light gate assembly 14 provides six individual columns of windows which may be operated to transfer red, green, and blue light to provide a single column which may include 1024 pixels. The individual columns of pixels so formed are sequentially provided from a frame buffer associated with the output of a computer in a manner well known to the prior art. These pixels are beamed to a scan mirror 16 which moves an incremental amount with each column of pixels until a distance has been traversed equivalent to the length of a row to be displayed. In one embodiment, a row consists of 1280 pixels so that a resolution of 1280 by 1024 is realized. At each individual step of the scan mirror 16, all of the pixels in the column are displayed. Then the scan mirror moves to the next succeeding pixel position and all of the pixels in that column are presented so that each pixel of each row appears in sequence as the columns are scanned across the eye by the scan mirror.

At each pixel position in the column, the appropriate light values of red, green, and blue are generated by the windows of the light gate and combined by projection to the same point to create the desired color at the pixel position. The individual colors are actually projected in sequence from the six columns as the scan mirror moves but are arranged to project to the same point. This takes place until all of the columns of pixels have been displayed and an entire pictures is displayed.

Figure 2:
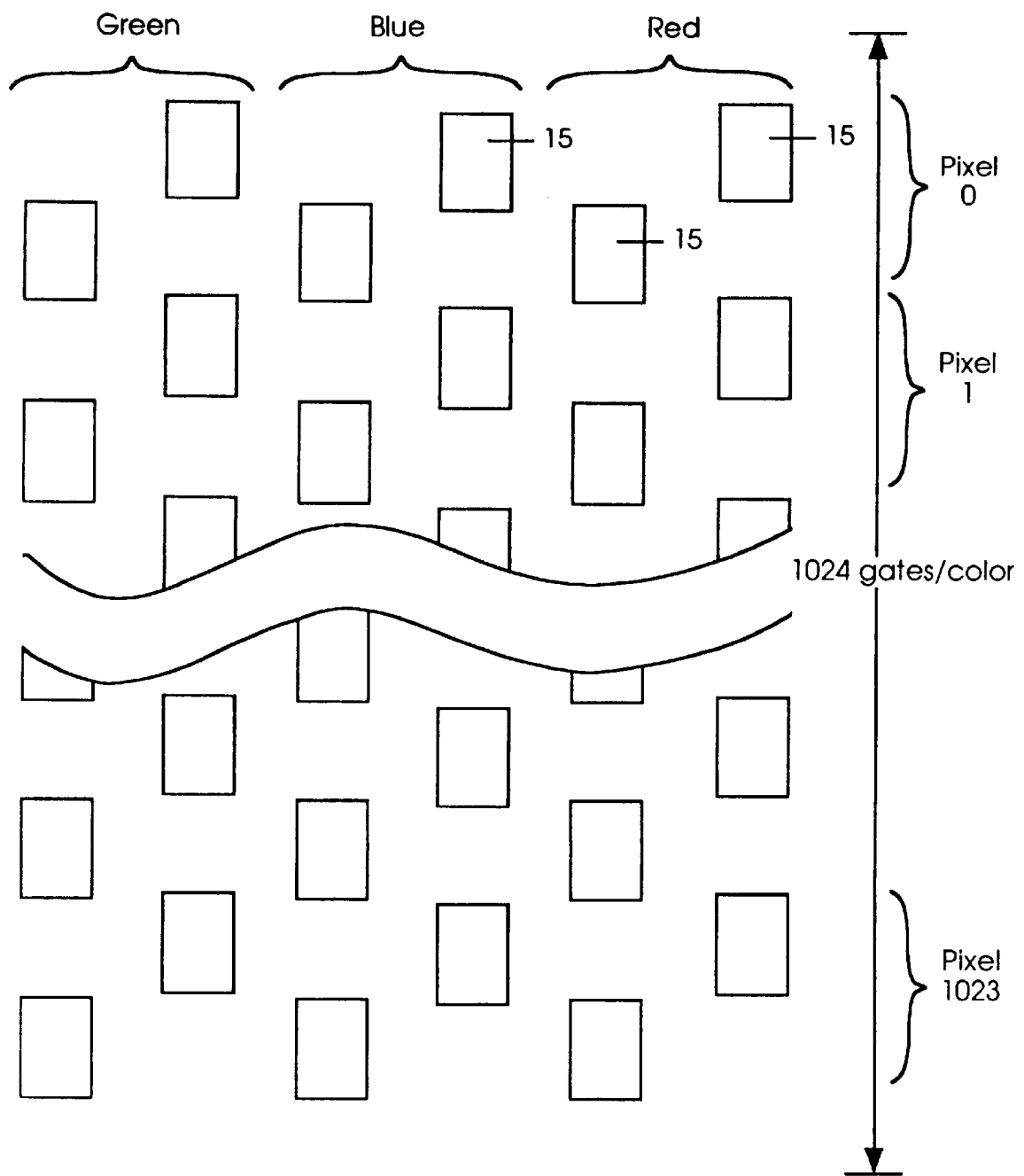
FIG. 2 is a general view of the layout of a light gate assembly constructed in accordance with the above-described recent invention.

The light beamed by the scan mirror 16 is focused by a lens assembly 18 and directed at a folding mirror 20. The folding mirror 20 directs the light to the eye of the wearer of the display 10 to present the picture. In one embodiment of the invention, the folding mirror 20 may be semi-transparent so that it provides a "look through" mode of operation which may be turned on and off through the use of a liquid crystal shutter 21 FIG. 2 illustrates, in general, the layout of a light gate assembly constructed in accordance with the previous invention. As may be seen in FIG. 2, the light gate 14 is comprised of six columns of what amount to individual windows 15 through which light may be shown. Two adjacent ones of these columns furnish green light through each window, two furnish blue light, and two furnish red light. The two columns of each color are arranged to be separated by an amount which is selected to provide an interval at which each window 15 is displayed to match the rate of scan of the mirror 16. In this manner, the two columns which represent a single color made be made to appear in the same column. By offsetting the two columns at the windows 15, however, the top and bottom edges of the adjoining pixels in a column are aligned, so that essentially complete vertical coverage is obtained. Moreover, by offsetting all six columns by the same amount, the windows of all three colors may easily be made to focus at the same point on the eye to produce the appropriate column of color pixels within the period during which the eye is able to retain the three color images.

Figure 3:
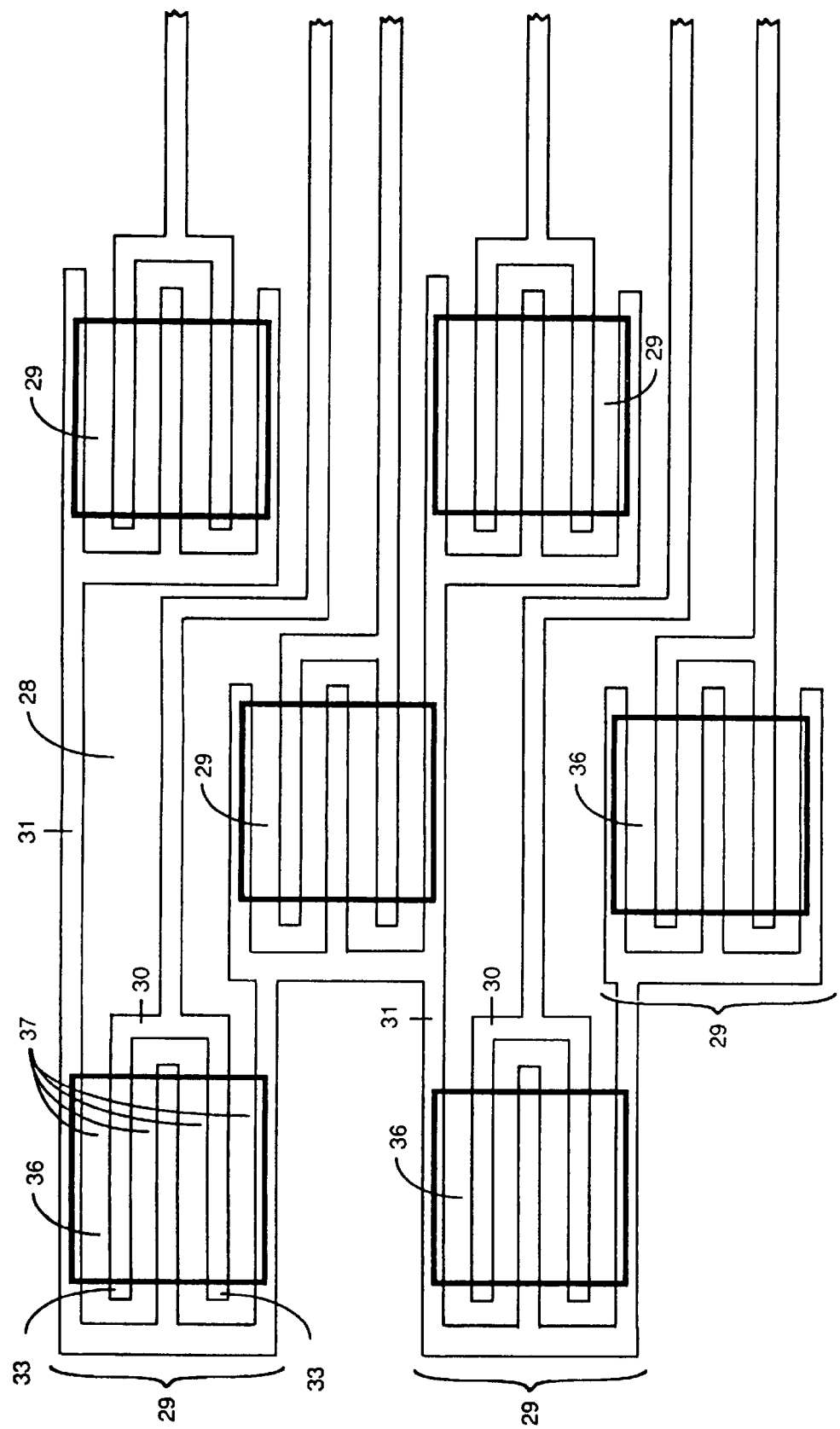
FIG. 3 is a detailed view of the layout of a light gate assembly constructed in accordance with the above-described recent invention.

Shown in FIG. 3 are the details of a portion of an array of windows 29 and an arrangement for opening and closing each of the windows utilizing a polarization rotating material which may be deposited on a transparent substrate. The details related to the construction of the individual windows and their operation are discussed at length in the above-mentioned copending patent application. Basically, the plane of polarization of the light passing through the individual windows 29 is rotated by voltages applied to conductors which pass adjacent to the windows. These voltage variations cause the windows 29 to open and close thereby allowing light to shine through or be blocked. Colored filters are provided on top of each window 29 to derive the required colors from a white light source. Alternatively, colored light sources may be used to provide the three colors of light.

As may be seen in FIG. 3, the bottom edge of the lowest opening 37 of the upper left hand window 29 lies at the same horizontal position as the top edge of the upper opening in the top window 29 of the central column. If these two columns carry the same filtered color, then the areas covered by this color touch one another when a column is displayed.

The individual ones of the six columns of windows are precisely and closely aligned so that they may be focused to a single line on the eye as the mirror 16 scans. In fact, the registration provided by the invention is more precise than can be attained in the usual cathode ray tube display. This may be accomplished because the array may be constructed using a photolithographic process to prepare all of the light gates simultaneously from a precisely aligned master mask.

It should be noted that the intensity variations of the different colors to provide the three different shades which are combined to form a final pixel color are accomplished by varying the time during which any such color of any pixel is displayed. This is essentially controlled by the time the individual windows are open to pass the colored light. It is obviously true that this control could not be accomplished by turning on and off the white light from which the shades are derived.

The preferred method of operating the scan mirror 16 and other details of the scanning operation as well as the details of the separation of the six individual columns so that all of the colors of a pixel may be precisely superimposed upon one another are all disclosed in detail in the copending patent application. Other particulars including the process for fabricating the light gates used are also described in detail in the copending patent application.

Although the arrangement of the copending patent application functions well, the light gate array for a 1024 row display will have 3072 connections for individual windows, and one or more common ground connections. This is a large number of connections which would be difficult, if not impossible, to attain using traditional wire-bonding methods. The large number of connections, although attainable within the technology described, does complicate the arrangement. The present invention reduces the number of individual windows utilized to one-third of the number used in the arrangement described in the copending patent application thereby substantially reducing the complication and cost of the arrangement.

Figure 4:
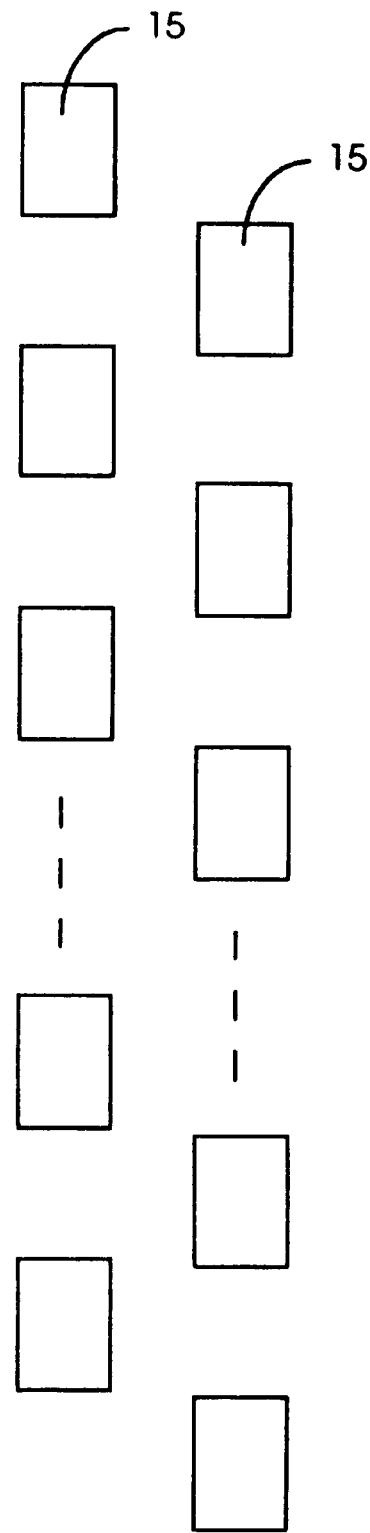
FIG. 4 is a general view of the layout of a light gate assembly constructed in accordance with the present invention.

FIG. 4 illustrates in general detail an arrangement in accordance with the present invention for providing a color display to be worn on the head. Illustrated in FIG. 4 are two sub-columns of windows which when projected may be made to provide the desired color display. Two rows are provided in order to obtain the precise registration whereby each sub-pixel exactly mates with the sub-pixels above and below in the array. Alternatively, a single row of windows might be used if a small distance between the sub-pixels above and below were felt to be acceptable.

In order to accomplish the display of color using only one or two columns of windows, the preferred embodiment of the invention uses frequency doubled laser diodes. These diodes offer at least two advantages over typical light emitting diodes. First, laser diodes are fast switching light sources. Second, these diodes may be manufactured to produce sufficient light in the appropriate ranges to display the three desired colors. Although the shortest wavelength anyone has caused a laser diode to run at is at the red end of the visual spectrum, it is not difficult to make laser diodes which produce light from about 0.9 to 1.5 microns. Moreover, the brightness of laser diodes is quite high even though the power is not. If the output of a laser diode is run through a small waveguide region such as lithium niobate waveguide or similar special plastic material, the response of the material is nonlinear in the E field. This nonlinear response to a waveform produces harmonics. This allows doubled frequencies to be derived of from 10 to 50% of the power from a few milliwatts of light. Using this technique and building the band gaps of the laser diodes appropriately, fairly high powers of light at the appropriate lightwave frequencies may be obtained. The techniques for manufacturing frequency doubled laser diodes are well known to those skilled in the art.

If all three of the individual lasers are then pulsed through a single window for the desired time to produce the appropriate shade of each color, the combined color of the pixel from the three shades is produced. If the picture is divided into vertical columns of red, green, and blue so that each group of three columns is the width of one pixel on the screen, then the diodes are sequentially pulsed to produce the three shades, three colored stripes are produced up and down the picture so close together that they fuse to one color in the eye.

The pulsing of the laser diodes to obtain the three colors is produced in the following manner. One of the diodes (red, for example) is pulsed on, and the window (or all of the windows of the column) is opened for the appropriate time to produce the appropriate shade of that color. This operation takes one third of the pixel time. Then the next colored diode is pulsed on and the window (or windows) opened for the appropriate time to produce the correct shade of that color for the pixel (or pixels). This takes another third of the pixel time. Finally, the third diode is pulsed on and the window (or windows) opened for the appropriate time to produce the correct shade of that color for the pixel (or pixels). The three colors transferred by the window (or windows) produce the three vertical lines which combine to produce the colors of the pixels.

The advantages of this system are manifold. It eliminates any critical alignment problems. An arrangement without any of the light filters of the prior device and many fewer conductors and light gate windows may be produced. Such an arrangement is much less expensive than is the device of the previous invention.

Figure 5:
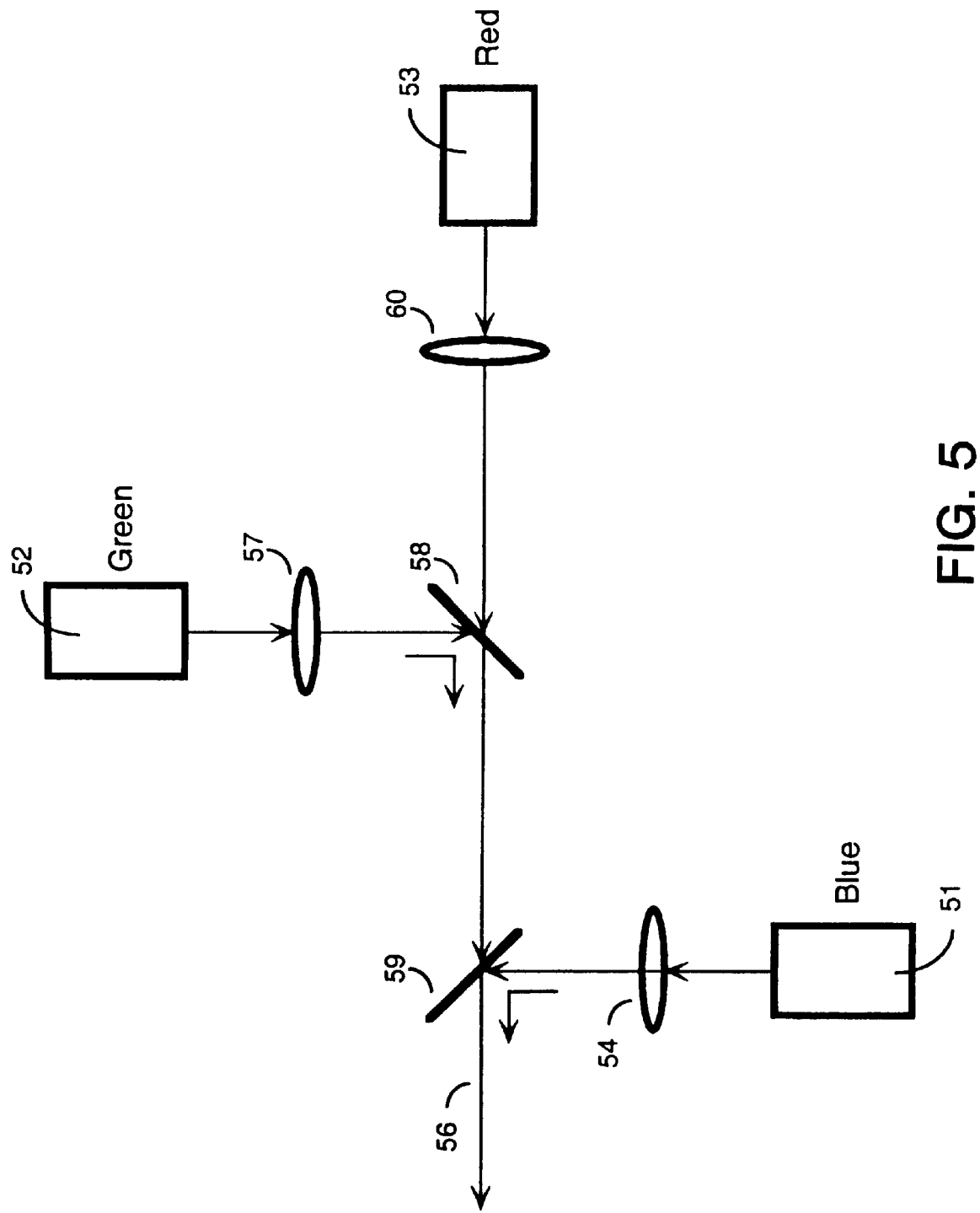
FIG. 5 is a detailed view of the layout of a portion of a light gate assembly constructed in accordance with the present invention.

FIG. 5 illustrates an arrangement by which three individual sources of light from three laser diodes may be furnished to a single window of a light gate constructed in a manner similar to those light gates illustrated in FIG. 3. In FIG. 5, an arrangement 50 is illustrated. The arrangement 50 includes a laser 51 which is a source of blue light, a laser 52 which is a source of green light, and a laser 53 which is a source of red light. The light from the laser 51 is projected through a lens 54 onto the surface of a blue reflecting dichroic mirror 55. The mirror 55 transfers the light to a path 56. In a similar manner, the light from the laser 52 is projected through a lens 57 onto the surface of a green reflecting dichroic mirror 58. The mirror 58 transfers the light to the path 56. The light from the laser 53 is transferred by a lens 60 directly along the path 56. The path may be directed to a window or to a light pipe (not shown) which carries the light from all sources to the windows. In this manner, all three of the sources of light may project light to the same light window where it may be passed to fall on the eye of the viewer to produce the desired colored pixel.

Figure 6:
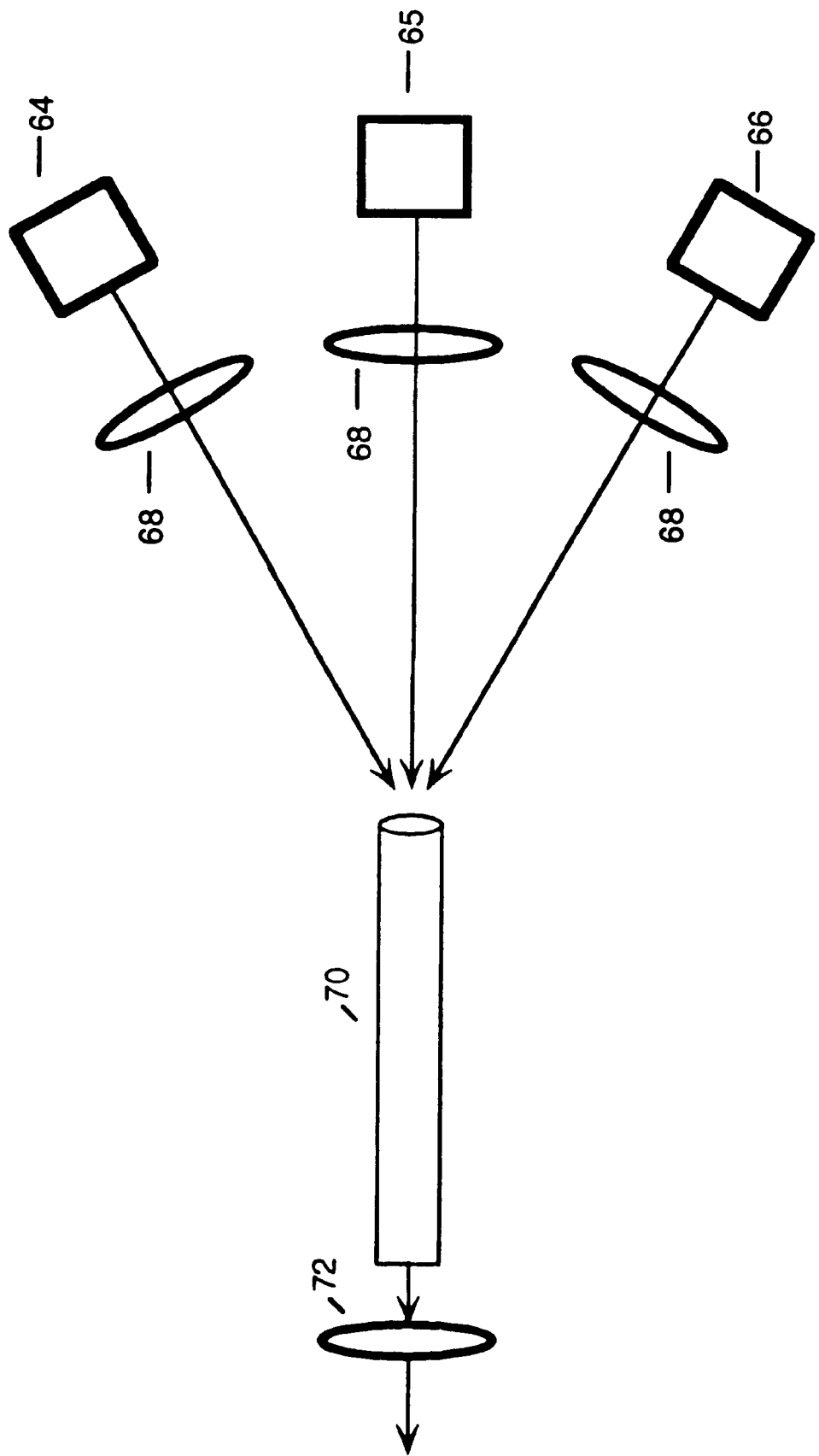
FIG. 6 is a detailed view of the another layout of a portion of a light gate assembly constructed in accordance with the present invention.

Another arrangement 62 for transferring three colors of light from three laser diodes 64–66 is illustrated in FIG. 6. In this arrangement, each diode 64–66 produces light which is transferred by a lens 68 directly to one end of a light pipe 70. The light pipe 70 may be manufactured of a plastic material in a manner well known to those skilled in the art the output of the light pipe 70 is directed through another lens 72 and onto the particular light gate window.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus for displaying a color image, said apparatus comprising:

pixel column rendering means for sequentially rendering individual columns of colored pixels, said pixel column rendering means including
a light gate array having a single column of windows, wherein adjacent windows of the column are offset from one another to comprise a first separate portion of windows disposed immediately adjacent to a second separate portion of windows, with top edges of windows of said first portion being aligned, with bottom edges of windows of said second portion;
means for providing red light to each of the windows of the light gate array for a first predetermined period;

means for providing green light to each of the windows of the light gate array for a second predetermined period, said second predetermined period not simultaneous with said first predetermined period;

means for providing blue light to each of the windows of the light gate array for a third predetermined period, said third predetermined period not simultaneous with said first predetermined period or second predetermined period;

means for opening pre-selected windows of said light gate array during pre-selected portions of the first, second, and third predetermined periods; and means for scanning the pixel column rendering means to generate an image from a plurality of sequentially-rendered individual pixel columns, with each of said individual pixel columns having red, green and blue color components offset from one another, with light pulses corresponding to a single column of pixels being alternatingly transmitted through said first and second portions of windows, and with said scanning means imaging pixels transmitted through said first and second portions of windows into a single column of aligned pixels.

2. The apparatus of claim 1 in which the means for opening comprises:

means for polarizing the light furnished to each of said windows from each of said light sources in a first sense; and means for selectively rotating the polarization of light transferred through each window of the light gate array, on a window-by-window basis.

3. The apparatus of claim 2 in which the means for selectively rotating the polarization of light transferred through each window of the light gate array comprises electrical field controlled polarizing means.

4. The apparatus of claim 1, wherein said means for providing said blue light to the window of the light gate array comprises a first frequency doubled laser diode providing said blue light, said means for providing green light to the windows of the light gate array comprises a second frequency doubled laser diode providing said green light, and said means for providing red light to the windows of the light gate array comprises a third frequency doubled laser diode providing said red light.

5. The apparatus of claim 4, further comprising a first lens, a second lens, a third lens, a green light reflecting dichroic mirror, and a blue light reflecting dichroic mirror, wherein said first frequency doubled laser diode, said first lens, and said blue light reflecting dichroic mirror are disposed to project blue light from said first frequency doubled laser diode through said first lens to said blue light reflecting dichroic mirror and to reflect said blue light from said blue light reflecting dichroic mirror to said windows of the light gate array;

said second frequency doubled laser diode, said second lens, and said green light reflecting dichroic mirror are disposed to project green light from said second frequency doubled laser diode through said second lens to said green light reflecting dichroic mirror and to reflect said green light from said green light reflecting dichroic mirror to said windows of the light gate array; and said third frequency doubled laser diode and said third lens are disposed to project red light from said third frequency doubled laser diode projects through said third lens, through said green light reflecting dichroic mirror, through said blue light reflecting dichroic mirror, and to said window of the column.

6. A method of rendering a color image, said color image having a plurality of colored pixel columns, said method comprising the steps of:

providing a column of controllable windows wherein adjacent windows of the column are offset from one another to comprise a first separate portion of windows disposed immediately adjacent to a second separate portions of windows, with top edges of windows of said first portions being aligned with bottom edges of windows of said second portions;

furnishing red, green, and blue light to said column of controllable windows; and repeatedly rendering colored pixel columns using said column of controllable windows; wherein said step of rendering colored pixel columns comprising the sub-steps of rendering a column of red pixels by transmitting red light through said column of controllable windows during pre-selected portions of a first time period;

rendering a column of green pixels by transmitting green light through said column of controllable windows during pre-selected portions of a second time period;

rendering a column of blue pixels by transmitting blue light through said column of controllable windows during pre-selected portions of a third time period; and scanning said colored pixel columns upon the eye of a viewer to create a color image, with each of said columns having red, green and blue pixels offset from one another, with light pulses corresponding to a single column of pixels being alternatingly transmitted through said two sets of portions of columns, and with said scanning means imaging pixels from said portions of columns into a single column of aligned pixels.

7. The method of claim 6, wherein the steps of rendering columns of color pixels further comprises the steps of:

polarizing the red, green and blue light furnished to said column of controllable windows in a first sense; and selectively rotating the polarization of the red, green and blue light furnished to said column of controllable windows.

8. The method of claim 7 wherein the step of selectively rotating the polarization of the light furnished to said column of controllable windows is performed using an electrical field controlled polarizer.

9. The method of claim 6, wherein said step of rendering a column of blue pixels by transmitting blue light through said column of controllable windows during portions of a third time period includes the step of emitting said blue light from a first frequency doubled laser diode; and said step of rendering a column of green pixels by transmitting green light through said column of controllable windows during portions of a second time period includes the step of emitting said green light from a second frequency doubled laser diode;

said step of rendering a column of red pixels by transmitting red light through said column of controllable windows during portions of a first time period includes the step of emitting said red light from a third frequency doubled laser diode.

10. The method of claim 9, wherein said step of rendering a column of blue pixels by transmitting blue light through said column of controllable windows during portions of a third time period further include the step of projecting said blue light emitted from said first frequency doubled laser diode through a first lens to a blue light reflecting dichroic mirror, and reflecting said blue light from said blue light reflecting dichroic mirror to said controllable window of the column;

said step of rendering a column of green pixel by transmitting green light through said column of controllable windows during a portion of second time period further includes the step of projecting said green light emitted from said second frequency doubled laser diode through a second lens to a green light reflecting dichroic mirror, and reflecting said green light from said green light reflecting dichroic mirror to said controllable window of the column; and said step of rendering a column of red pixels by transmitting red light through said column of controllable window during portions of a first time period includes the step of projecting said red light emitted from said third frequency doubled laser diode through a third lens, through said green light reflecting dichroic mirror, through said blue light reflecting dichroic mirror, and to said controllable windows of the column.

11. A display apparatus for displaying a color image to a viewer, said apparatus comprising:

means for repeatedly sequentially generating pulses of red, blue and green light having substantially equal duration;

means for routing said pulses of red, green and blue light to each of a column of linearly arranged windows wherein adjacent windows of the column are offset from one another to comprise a first separate portion of a column of windows disposed immediately adjacent to a second separate portion of a column of windows, with top edges of windows of said first portion being aligned with bottom edges of windows of said second portion, said means for routing including first, second and third lenses;
a green light reflecting dichroic mirror; and
a blue light reflecting dichroic mirror; and wherein
said first lens and said blue light reflecting dichroic mirror are disposed to project blue light through said first lens to said blue light reflecting dichroic mirror and to reflect said blue light from said blue light reflecting dichroic mirror to said windows;
said second lens and said green light reflecting dichroic mirror are disposed to project green light through said second lens to said green light reflecting dichroic mirror and to reflect said green light from said green light reflecting dichroic mirror to said windows; and
said third frequency doubled laser diode and said third lens are disposed to project red light through said third lens through said green light reflecting dichroic mirror, through said blue light reflecting dichroic mirror, and to said windows;

means for controlling, on a window-by-window basis, amounts of said red, blue and green light passed through said windows in accordance with preselected ratios of red, green and blue to sequentially generate columns of red, blue and green pixels of generally differing duration, said means for controlling including
means for polarizing the light furnished to each of said windows in a first sense; and
means for selectively rotating the polarization of light transferred through each window of the light gate array, on a window-by-window basis; and means for scanning said sequential-generated columns of red, green and blue pixels and for generating an image from a plurality of said columns of pixels, with every set of three successive columns of red, green and blue pixels being imaged closely adjacent to one another to yield a single column of colored pixels, and with a plurality of successively generated columns of colored pixels being imaged adjacent to one another to yield a colored image, with light pulses corresponding to a single column of pixels being alternatingly transmitted through said two sets of portions of columns, and with said scanning means imaging pixels from said portions of columns into a single column of aligned pixels.

12. A method for displaying a color image, said method comprising the steps of:

repeatedly sequentially generating pulses of primary light colors having substantially equal duration;

routing said pulses of primary light colors to each of a plurality of linearly arranged windows, wherein adjacent windows of the column are offset from one another to comprise a first separate portion of windows disposed immediately adjacent to a second separate portion of windows, with top edges of windows of said first portion of windows being aligned with bottom edges of windows of said second portion of windows;

controlling, on a window-by-window basis, amounts of said primary light colors passed through said windows in accordance with preselected ratios of primary light colors to sequentially generate columns of primary light pixels of generally differing duration; and scanning said sequential-generated columns of primary light pixels to generate an image from a plurality of said columns of pixels, with each set of three sequentially-generated columns of primary light pixels being imaged closely adjacent to one another to yield a single column of colored pixels, and with a plurality of successively generated columns of colored pixels being imaged adjacent to one another to yield a colored image, with light pulses corresponding to a single column of pixels being alternatingly transmitted through said two sets of portions of said columns of windows, and with said scanning means imaging pixels from said portions of columns into a single column of aligned pixels.

* * * * *